United States Patent
Randa et al.

(10) Patent No.: US 11,619,336 B2
(45) Date of Patent: Apr. 4, 2023

(54) PIPE SLITTING MACHINE WITH ROPE STORAGE REEL

(71) Applicant: The Charles Machine Works, Inc., Perry, OK (US)

(72) Inventors: Mark D. Randa, Oconomowoc, WI (US); Robert F. Crane, Nekoosa, WI (US); Steven W. Wentworth, Scottsdale, AZ (US); Kelvin C Aus, Watertown, WI (US)

(73) Assignee: The Charles Machine Works, Inc., Perry, OK (US)

( * ) Notice: Subject to any disclaimer, the term of this patent is extended or adjusted under 35 U.S.C. 154(b) by 297 days.

(21) Appl. No.: 17/022,513

(22) Filed: Sep. 16, 2020

(65) Prior Publication Data

US 2021/0107074 A1 Apr. 15, 2021

Related U.S. Application Data

(60) Provisional application No. 62/900,859, filed on Sep. 16, 2019.

(51) Int. Cl.
| | |
|---|---|
| *F16L 55/18* | (2006.01) |
| *F16L 55/30* | (2006.01) |
| *F15B 15/20* | (2006.01) |
| *F16L 55/165* | (2006.01) |
| *B23D 21/04* | (2006.01) |
| *B66D 1/60* | (2006.01) |
| *F16L 1/032* | (2006.01) |

(52) U.S. Cl.
CPC ............ *F16L 55/18* (2013.01); *F15B 15/20* (2013.01); *F16L 55/1658* (2013.01); *F16L 55/30* (2013.01); *B23D 21/04* (2013.01); *B66D 1/60* (2013.01); *F16L 1/032* (2013.01)

(58) Field of Classification Search
CPC ....... F16L 55/18; F16L 55/1658; F16L 55/30; F16L 2101/50
See application file for complete search history.

(56) References Cited

U.S. PATENT DOCUMENTS

| | | | |
|---|---|---|---|
| 4,507,019 A | 3/1985 | Thompson | |
| 5,098,225 A | 3/1992 | Rockower et al. | |
| 5,211,509 A * | 5/1993 | Roessler | F16L 1/065 |
| | | | 405/184 |
| 5,328,297 A * | 7/1994 | Handford | E02F 5/10 |
| | | | 405/184 |

(Continued)

OTHER PUBLICATIONS

Earth Tool Company LLC "Hammerhead Trenchless—High Tech, High Performance Cable Winch Hydroguide® HG375" brochure for a Hydroguide 375 Winch, 2019, 2 pages.

*Primary Examiner* — Frederick L Lagman
(74) *Attorney, Agent, or Firm* — Tomlinson McKinstry, P.C.

(57) ABSTRACT

A wire pulling assembly for pulling a wire carrying tooling through an underground environment. The pulling assembly includes a cyclical vise carried by one or more hydraulic cylinders attached to a frame. The cylinders have a pulling stroke and a retraction stroke. A powered reel is used to store the wire as it is removed from the ground. During a pulling stroke, the reel is hydraulically isolated such that cable is stripped from the reel with tension maintained in the cable. During a retraction stroke, a motor turns the reel to load excess cable onto the reel.

22 Claims, 8 Drawing Sheets

(56) References Cited

U.S. PATENT DOCUMENTS

| | | | |
|---|---|---|---|
| 5,651,639 A | | 7/1997 | Wentworth et al. |
| 5,895,176 A | * | 4/1999 | Puttman .................. E21B 7/206 |
| | | | 405/184 |
| 6,672,802 B2 | * | 1/2004 | Putnam .................. B66D 3/006 |
| | | | 405/184 |
| 7,086,808 B2 | | 8/2006 | Wentworth et al. |
| 7,156,585 B2 | * | 1/2007 | Wang ....................... F16L 55/30 |
| | | | 405/184.2 |
| 9,566,653 B2 | | 2/2017 | Randa |
| 10,167,986 B2 | * | 1/2019 | Tjader ................. F16L 55/1658 |
| 10,619,783 B2 | * | 4/2020 | Tjader ................. F16L 55/1658 |
| 10,927,994 B2 | * | 2/2021 | Tjäder ................. F16L 55/1658 |
| 11,378,218 B2 | * | 7/2022 | Tjader ................. F16L 55/1658 |
| 2001/0018007 A1 | | 8/2001 | Puttmann |
| 2002/0081154 A1 | * | 6/2002 | Herrick .............. F16L 55/1658 |
| | | | 405/184 |
| 2002/0114671 A1 | | 8/2002 | Wentworth et al. |
| 2003/0147700 A1 | * | 8/2003 | Carter .................... E21B 29/10 |
| | | | 405/184 |
| 2004/0218982 A1 | | 11/2004 | Wentworth et al. |
| 2007/0048090 A1 | * | 3/2007 | Wentworth ............... E02F 5/10 |
| | | | 405/174 |
| 2007/0048091 A1 | | 3/2007 | Tjader |
| 2011/0079469 A1 | | 4/2011 | Tjader |
| 2011/0081205 A1 | | 4/2011 | Tjader |
| 2011/0081206 A1 | | 4/2011 | Tjader |
| 2011/0206462 A1 | | 8/2011 | Sutton |
| 2013/0219670 A1 | | 8/2013 | Tjader |
| 2014/0241812 A1 | | 8/2014 | Herrick |
| 2017/0089501 A1 | * | 3/2017 | Tjader .................... F16L 55/18 |

* cited by examiner

PIPE SLITTING MACHINE WITH ROPE STORAGE REEL

BACKGROUND

Service line slitting of a host pipe offers two major benefits for both the owner of the pipeline and the public. Firstly, the method places the new pipe on the exact path of the existing host pipeline thereby staying within the pipeline right-of-way as required, as well as minimizing but not eliminating the risk of damage to adjacent closely spaced utilities that may be parallel in path or cross the path of the host pipe. Secondly, both parties mentioned benefit from a surgical, quick, relatively non-disruptive method to replace the buried utility. An example of such a slitting apparatus and method is found in U.S. Pat. No. 9,566,653, issued to Randa, et al., the contents of which are incorporated by reference herein.

There are generally two variations on slitting small diameter pipes. The first method calls for the slitting of an existing host pipe and simultaneously installing the replacement pipe. Most often an expander is pulled behind the slitting blade to expand the surrounding soil, thereby allowing said replacement pipe to easily enter the volume also occupied by the remnants of the host pipe. Slitting blade and expander are pulled through the host pipe with a high strength strand, most often wire rope, and in most situations, the product pipe is pulled in by the strand as well.

Alternatively, the variation to this method includes the intermediate step of withdrawing the slit remains of the host pipe before the replacement pipe is installed.

The replacement pipe may be attached to the tail of the host pipe remnant facilitating installation of the replacement pipe as the host pipe remnants are extracted, or the replacement pipe may be pulled in after extraction of the remnants with an extended length of the strand.

Both of these methods produce the desired result of a new pipe installed along the path of the host pipe. However, the first method leaves the host pipe remnants surrounding the replacement pipe. If the host pipe material was any grade of polyethylene, it is unlikely that there would be any integrity damage to the product (replacement) pipe caused by the replacement pipe sliding beside the remnants. However, host pipes such as steel, copper or lead may be left with sharp edges from the slitting process. These sharp edges may be capable of damaging the product pipe. Blade configurations can deal with sharp edges so as to minimize risk, but the remnants may also increase difficulty when new connections or repairs are made. By removing the slit pipe, the risk of damage to the product pipe is reduced by eliminating the contact between remnants and product pipe both during installation and during the new pipes life.

Both methods require the use of a strand. The first method requires a strand (hereafter wire rope or rope) that is somewhat longer than the run of host pipe being replaced. The second method, depending on the variation, may require a rope that is slightly more than twice the length of the host pipe. In general, crews performing the slitting process will be prepared to do runs of 100 ft, meaning something over 100 ft. (or perhaps well over 100 ft.) of rope is needed. The rope is typically 5/16's or 3/8's inch diameter as these sizes offer a breaking strength that is sufficient to withstand the combined slitting and soil expansion work.

In known methods, the towing force may be provided by a constant force, dual capstan winch. Such winches may be capable of storing over 4,000 ft of rope on its storage reel. An example of this machine is the HG375 by Hammerhead Trenchless. A benefit of using a winch of this type is that the two methods described can be performed with only two operators. The first operator tends the product pipe as it enters the access pit and the second operator operates the winch. A dual capstan winch of this type is large, complex and a meaningful financial investment.

Alternative machines may be smaller and may perform similar methods, but do not provide storage for the wire rope. These machines use a cyclic hydraulic puller to pull tooling through lateral sewer house connections of 4 or 6 inch diameter. Such machines do not utilize reels, as the repeated and non-continuous progress of the wire rope out of the hydraulic puller presents difficulty for the reel.

SUMMARY

The invention is directed to a wire pulling apparatus comprising a frame, a pulling cylinder, a vise assembly and a reel. The pulling cylinder has a stationary and a movable end. The cylinder is attached to the frame at the stationary end. The movable end is extendable relative to the stationary end. The vise assembly is configured to grip a wire rope and attached to the pulling cylinder at the movable end. The reel is disposed within the frame.

DETAILED DESCRIPTION

Figure 1:
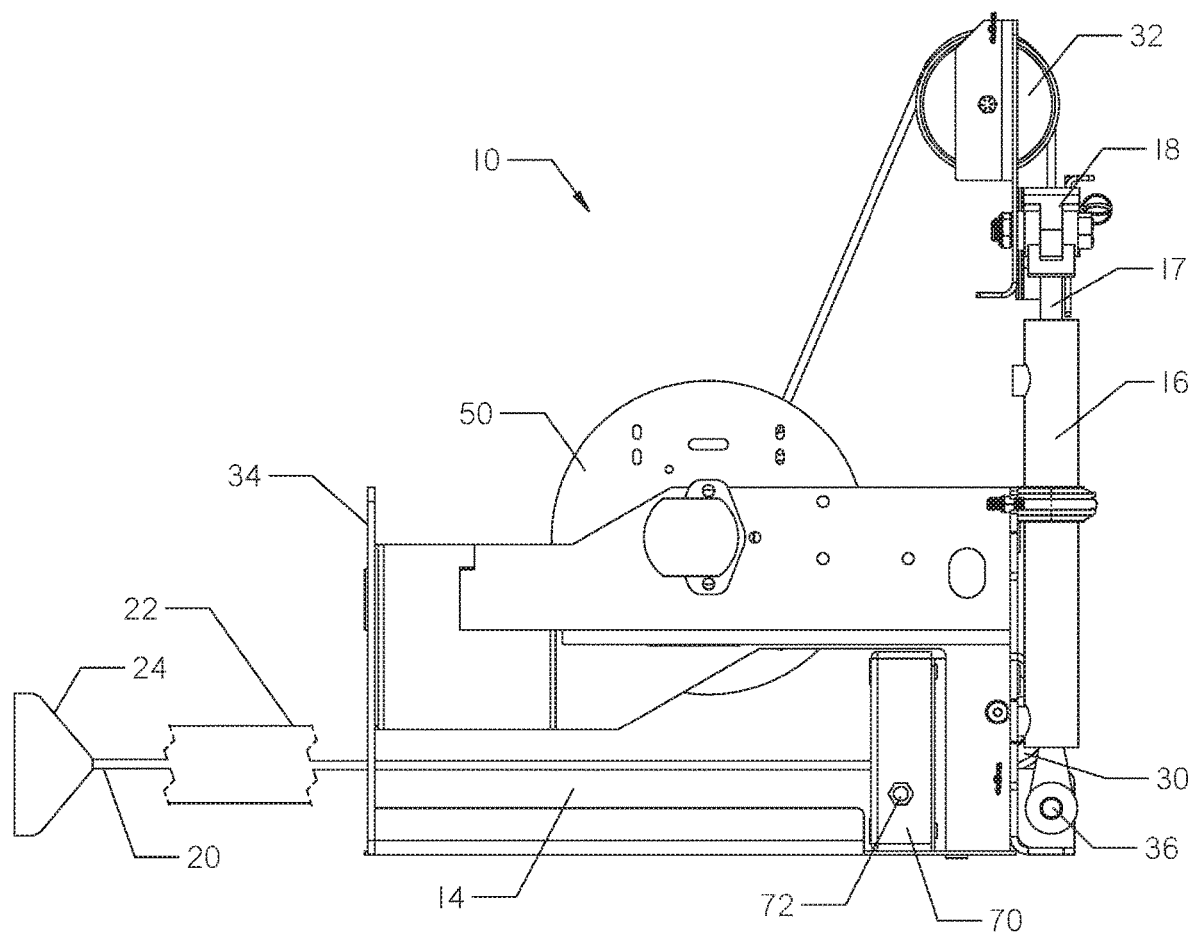
FIG. 1 is a left side view of a wire rope pulling machine with reel and pull cylinders in the retracted position. The tooling and pipe being replaced are shown in this Figure, and omitted from the remaining Figures.
Figure 2:
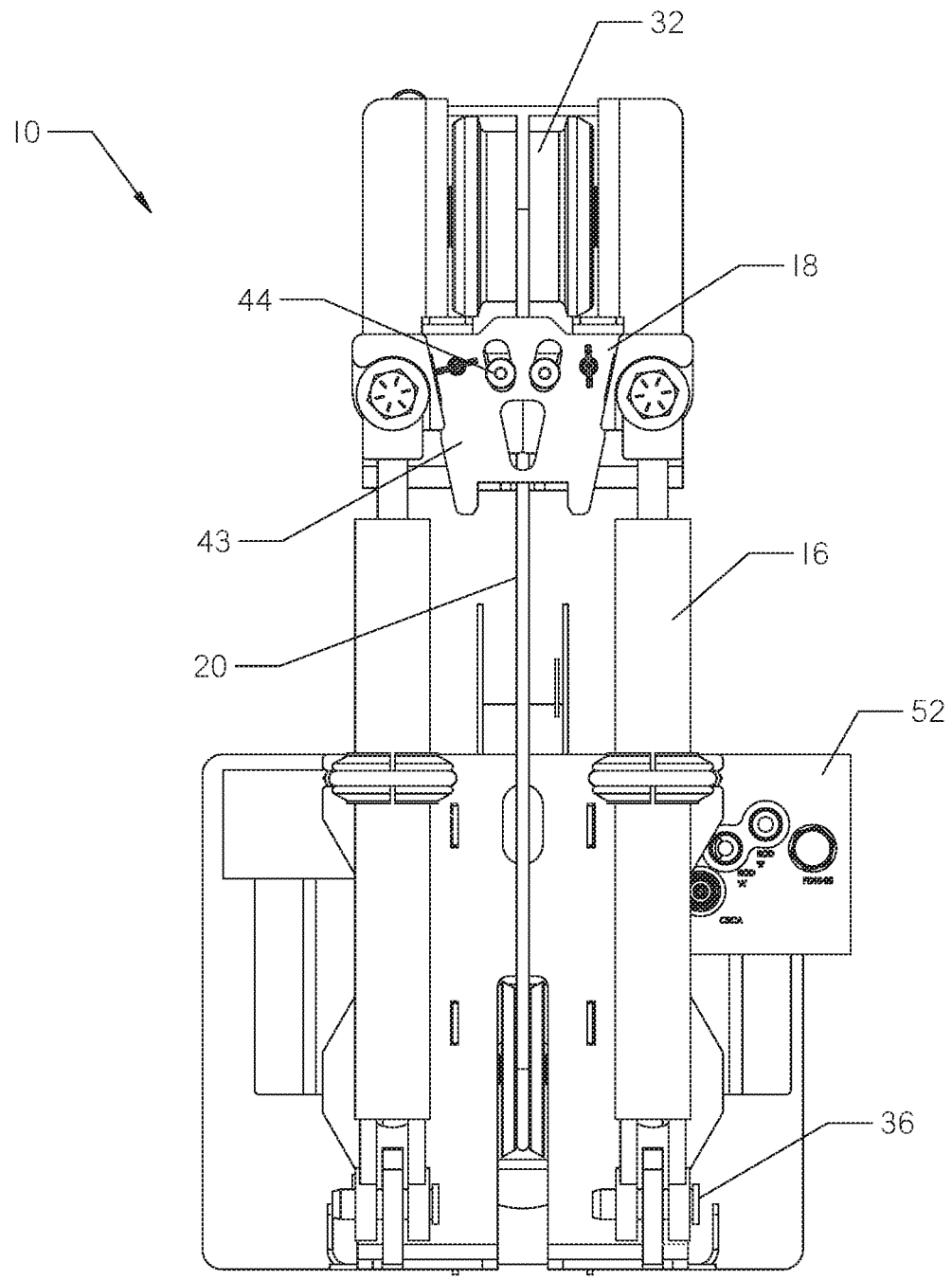
FIG. 2 is a rear view of a wire rope pulling machine with reel, pull cylinders in the retracted position.

As discussed in the Background, existing solutions fail to store a wire rope when a cyclic puller is used. As a result, the wire rope must be coiled as the slitting process progresses and additional rope is added beyond the pulling jaw. If the rope is not manually coiled, or at a minimum pulled away from the machine, there is risk that the considerable length of rope will become tangled in the cyclic machine and jam or damage it.

Managing wire rope by hand causes one to move about on the ground surface making it difficult to protect a worker from an electrical strike as the use of a grounding mat is required. In addition, the worker would be handling a primary conductor nearly 100% of the time, putting the worker at risk should a strike with a high voltage buried electrical conductor occur.

With reference now to the figures in general, a wire rope pulling machine 10 is shown with a hydraulic reel system 12 which addresses the shortcomings of present hydraulic pulling solutions.

With reference to FIGS. 1-6, the wire rope pulling machine 10 comprises a structural mounting frame 14, one or more hydraulic pulling cylinders 16, a vise assembly 18, a bungee vise assembly 19 (FIGS. 8-9) and the reel system 12. A wire rope passes through a host pipe 22 being slit in an underground area, which is ahead of and away from the machine 10. The path of the wire rope 20 passes through the open bottom of the frame 14.

The wire rope 20 is attached to tooling 24 such as the slitter of the incorporated Randa reference. The slitter 24 may be pulled into the frame 14 to complete the slitting operation.

The pulling machine 10 comprises a first pulley 30 and a second pulley 32 for changing the orientation of the wire rope 20 as it passes through the structural frame 14. As shown, the wire rope 20 orientation changes from horizontal (or at the slope of the host pipe 22) and is adjusted by approximately ninety degrees to substantially vertical by going around the first pulley 30. While vertical, the wire rope 20 passes through the bungee vise assembly 19 (FIGS. 8-9) and the vise assembly 18 between the axes of the two pulling cylinders 16 shown in the figures.

As shown, two pulling cylinders 16 carry the vise assembly 18 and the second pulley 32. The pulling cylinders 16 coordinate to extend while the vise assembly 18 is gripping the wire rope 20. The vise assembly 18 may comprise any system capable of selectively gripping, pulling and releasing a wire rope 20.

Figure 6:
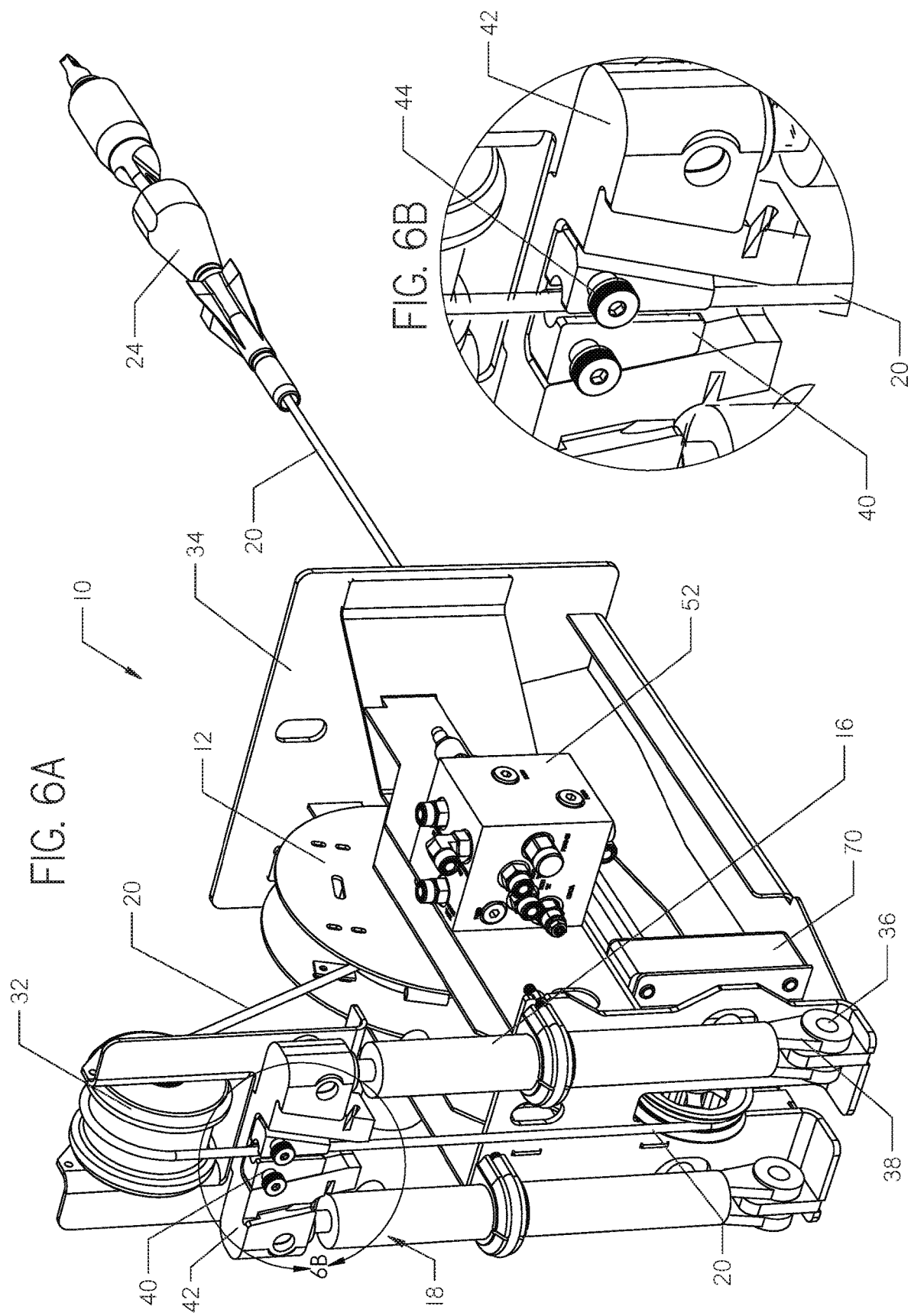
FIG. 6A is a rear right perspective view of the wire rope machine with the jaw plate uncovered and the jaws shown in detail view.
FIG. 6B is a detail view of the region highlighted in FIG. 6A.

As shown best in FIG. 6, the vise assembly 18 comprises a pair of opposed jaws 40 disposed in a jaw block 42. The jaws 40 are each tapered from a narrow end, nearest the first pulley 30, and a wide end away from the pulley. The jaws are loosely coupled to the jaw block 42 or an incorporated mounting plate 43 (FIG. 2) with shoulder bolts 44. The mounting plate 43 is removed in FIG. 6 for clarity.

As the pulling cylinders 16 extend, the jaws 40 float within the jaw frame 42. Because of the taper, friction between the wire rope 20 and jaws 40 cause each jaw to move toward the narrow end of the taper, moving the jaws closer together and gripping the wire rope 20. Conversely, when the pulling cylinders 16 retract, frictional forces move the jaws 40 to the wider end, allowing the jaws to slide past the wire rope 20 for a subsequent pull at a new location on the wire rope. Alternative methods include mechanically or hydraulically actuated jaws or grippers.

The wire rope 20 is under tension between the tooling 24 and the vise assembly 18. This tension may be between 2000 lb and some significant percentage of the breaking strength of the rope—approximately 5 tons for 5/16" diameter extra improved plow steel rope. After the jaws 40 release, the tension in the rope 20 drops precipitously.

Figure 8:
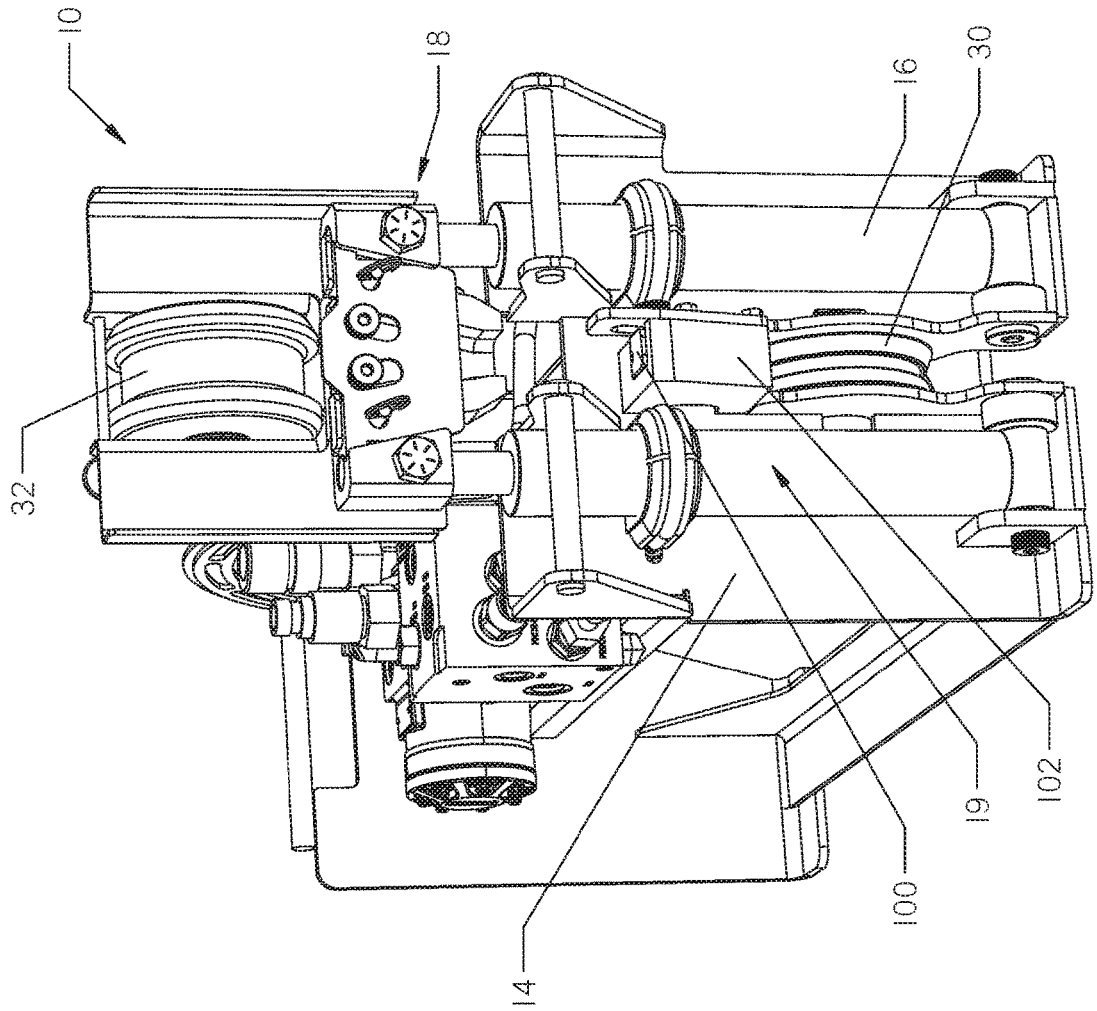
FIG. 8 is a rear right perspective view of the wire rope machine, with a bungee vise assembly shown. The bungee vise assembly is hidden in FIGS. 1-6. The wire rope is hidden in FIG. 8.

To prevent the wire rope 20 from recoiling under this tension, the bungee vise 19 is provided, attached to the frame 14. In FIG. 8, the bungee vise is shown in some detail. The bungee vise 19 grips the wire rope 20 (not shown in FIG. 8) during the retraction stroke of the pulling cylinders 16. The bungee vise 19 comprises a jaw 100 and a jaw block 102. Like in vise assembly 18, tension in the wire rope 20 towards the first pulley 30 forces the jaw 100 into the jaw block 102, gripping the wire rope. Tension in the wire rope away from the first pulley 30, such as when the pulling cylinders 14 extend, will release the grip of the bungee vise 19.

Figure 9:
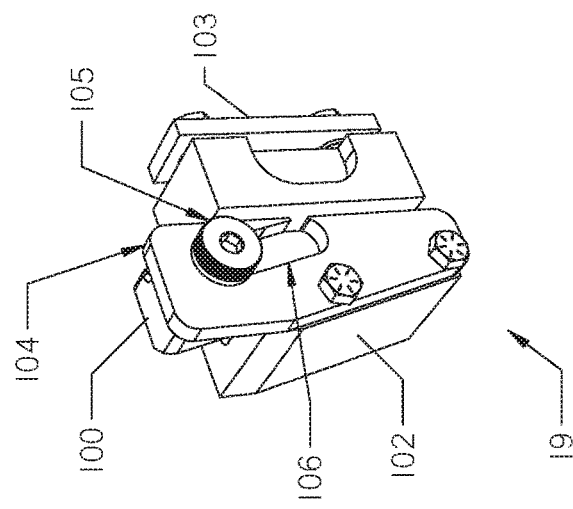
FIG. 9 is a side view of the bungee vise assembly.

With reference to FIG. 9, the jaw block 102 is secured to the frame 14 by a plate 103. A side plate 104 is secured to the jaw block, and a shoulder bolt 105, attached to jaw 40, rides in a slot 106 formed in the side plate 104.

The reel system 12 comprises a reel 50 and a hydraulic reel motor 52. Further, the system 12 may comprise a loading tube 44, a slot 46, and a clamp 48. During loading of rope 20 onto the reel system 12 before the first pull, the rope end is secured to the reel 50. The rope 20 may be threaded through tube 44 which is welded to the reel 50, through the slot 46 in the sidewall of reel 50 and finally clamped to the reel sidewall with clamp 48. The reel 50 may be turned in either clockwise or counterclockwise direction to wind the rope 24.

Hydraulic connections to the cylinders 16 and reel motor 52 are not shown. Such connections are represented schematically in FIG. 7, and are a part of a hydraulic manifold 60.

The pulling machine 10 further comprises an electric strike coil 70. The wire rope 20 passes through electrical strike coil 70 as it enters the machine 10. The path shown brings it through what is nominally the center of coil 70. Coil 70 senses electrical current passing through the wire rope 20 path. As shown, the first pulley 30 is a sheave which is electrically conductive to the frame 14. Therefore, the strike coil 70 is best placed between the first pulley 30 and the tooling 24, rather than after the first pulley.

A coil signal terminal 72 is connected to monitoring hardware. A warning strobe light and horn will be sounded should an electrical strike occur, alerting the operator standing on a grounding mat (not shown) not to leave the mat and for other operators to stay clear of the are and to have the power utility cut power to the area and repair the damage.

The frame 14 comprises a shoring face 34 which bears against the face of the excavation created to gain access to the host pipe 22. The force bearing on face 34 is approximately equal to the tension in rope 20. The cylinders 16 may be secured to the frame 14 by cylinder end pins 36 as well as U-bolts 38.

Figure 3:
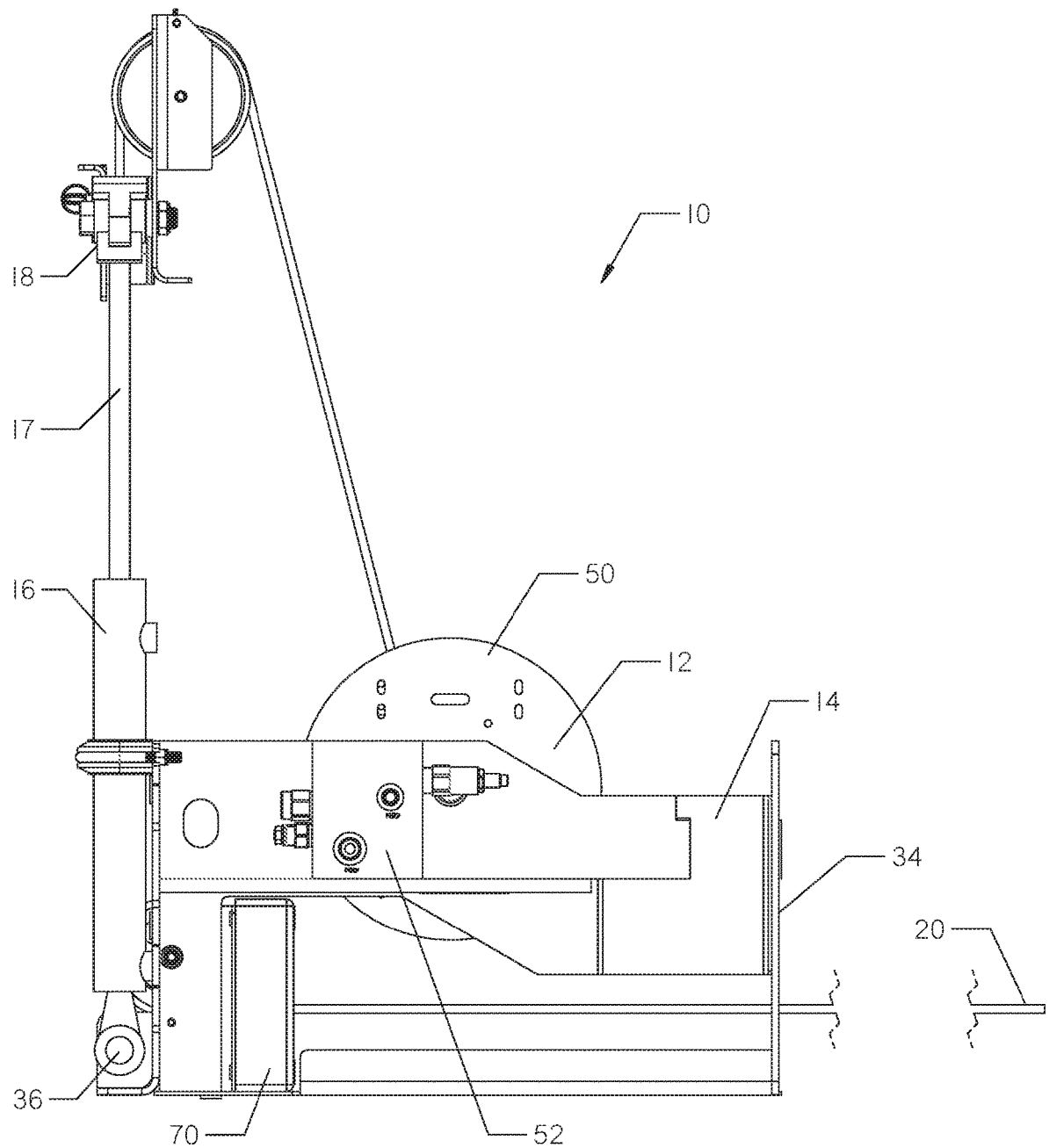
FIG. 3 is a right side view of a wire rope pulling machine with reel, pull cylinders in the extended position.
Figure 4:
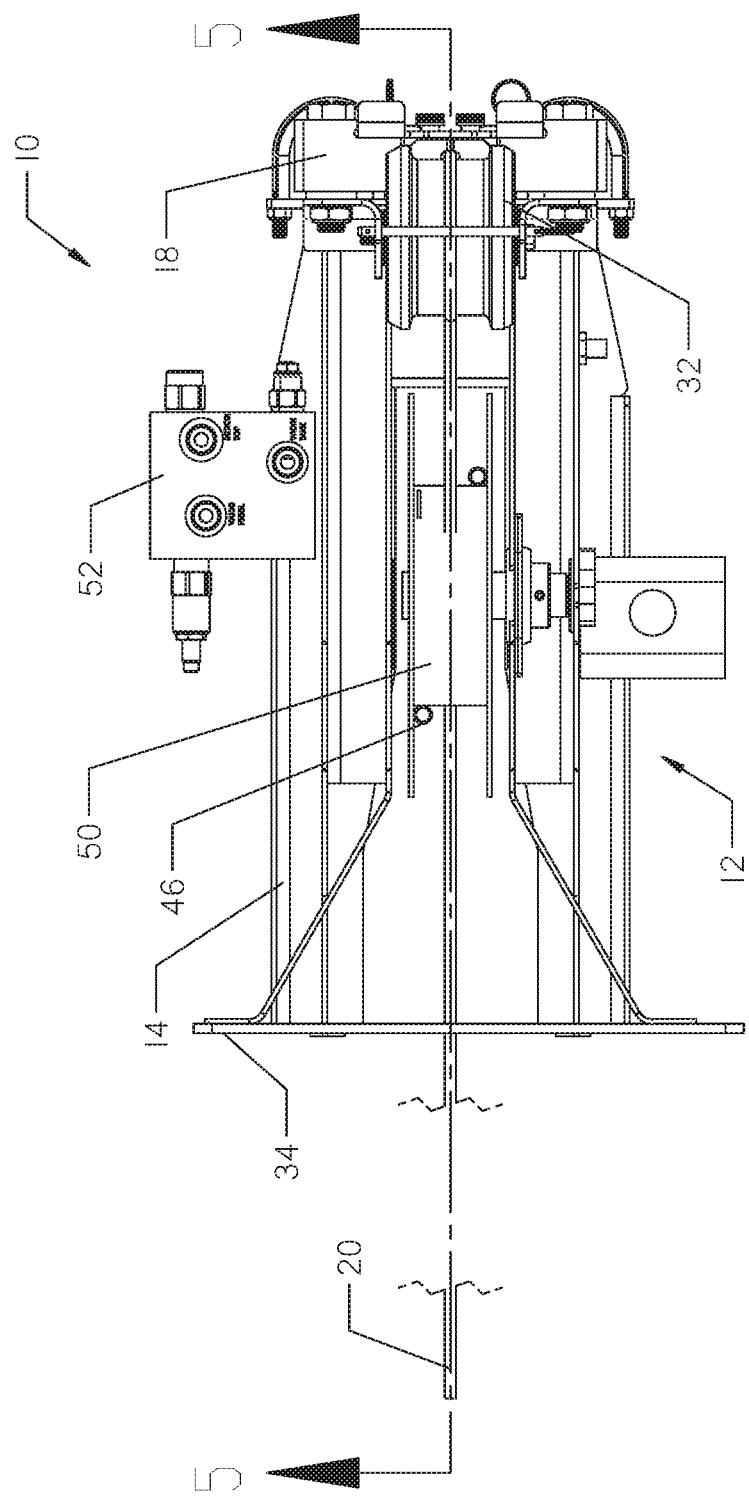
FIG. 4 is a top view of a wire rope pulling machine with reel.
Figure 5:
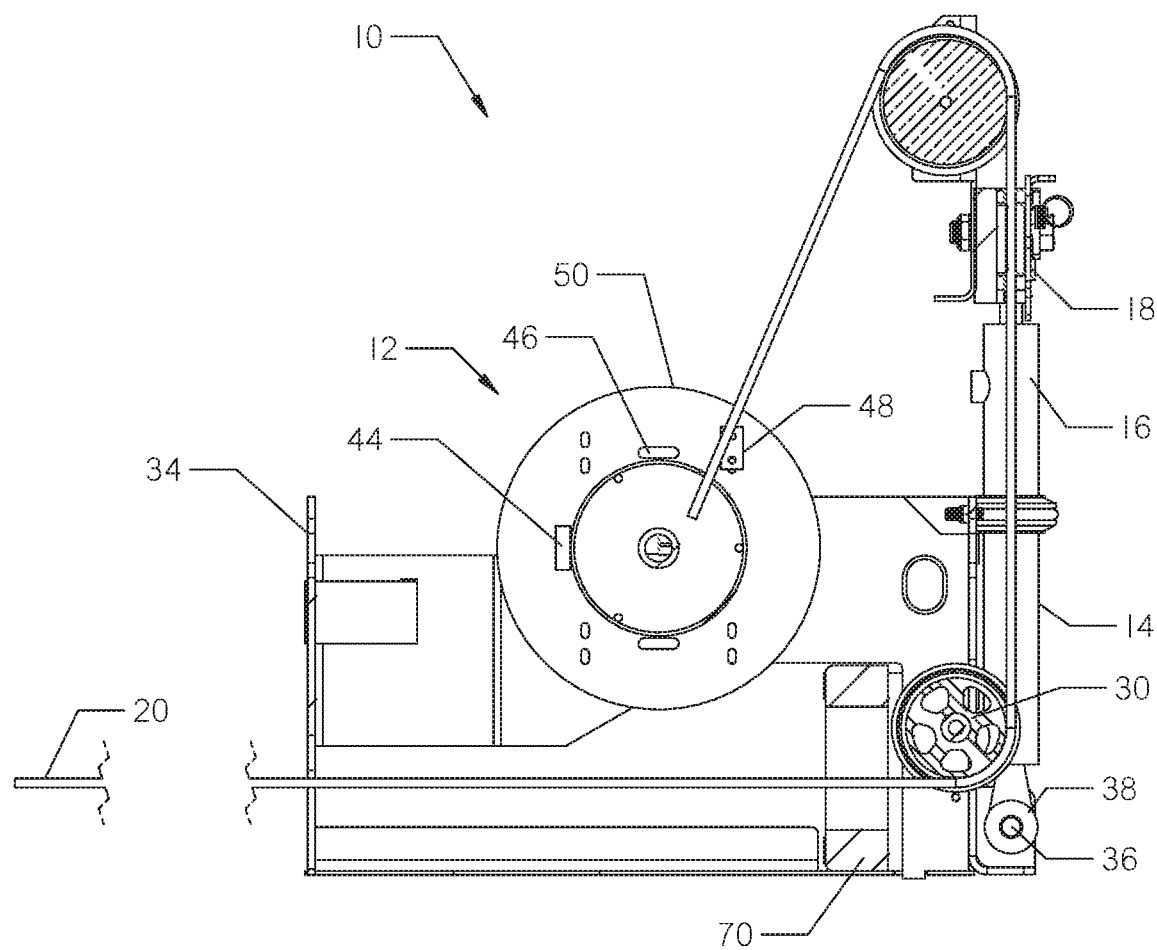
FIG. 5 is a left side section view of a wire rope pulling machine with reel sectioned along section 5-5 of FIG. 4. A pipe and tooling are shown in the lower right corner of the figure.

The pulling cylinders 16 are shown retracted in FIGS. 1, 2, 4, 5 and 6 and extended in FIG. 3. A short section of cylinder rod 17 is exposed when retracted, while an additional 10 inches of rod 17 can be seen in FIG. 3.

A challenge that must be overcome designing a rope storage reel system 12 for a cyclic hydraulic machine 10 lies in the fact that the cyclic machine has jaws 40 that cycle back and forth along a linear axis. As shown, pulling jaw 40 movement is vertical and therefore the thrust cylinders 16 are oriented vertically, though other orientations are possible. The second pulley 32 is utilized to change the direction of the wire rope 20, allowing the reel 50 to be placed low in the machine 10, taking advantage of available space.

This orientation does not lend itself to a unidirectional winding operation during the movement of the pulling jaws 40 produced by extension or retraction of the thrust cylinders 16. As the cylinders 16 retract and move pulling the vise assembly 18 downward, nominally toward the storage reel 50, rope 20 becomes available to wind onto the reel. The hydraulic reel motor 52 thus rotates the reel 50 to take up excess rope during retraction of the thrust cylinders 16.

When the cylinders 16 extend, the vise assembly moves the rope 20 and attached tooling 24 (FIG. 1) through the host pipe 22. The second pulley 32 moves upward and wire rope 20 must be stripped from the rope storage reel 50.

Hydraulic motors are sometimes reversible by reversing the hydraulic fluid flow direction. Such a bidirectional motor 52 would drive the reel 50 in opposite directions. Conversely, as shown in the figures, modest tension may be produced on the rope 20 between the vise assembly 18 and the reel 50 at all times, whether the rope 20 is being wound onto the reel 50 or stripped off.

Figure 7:
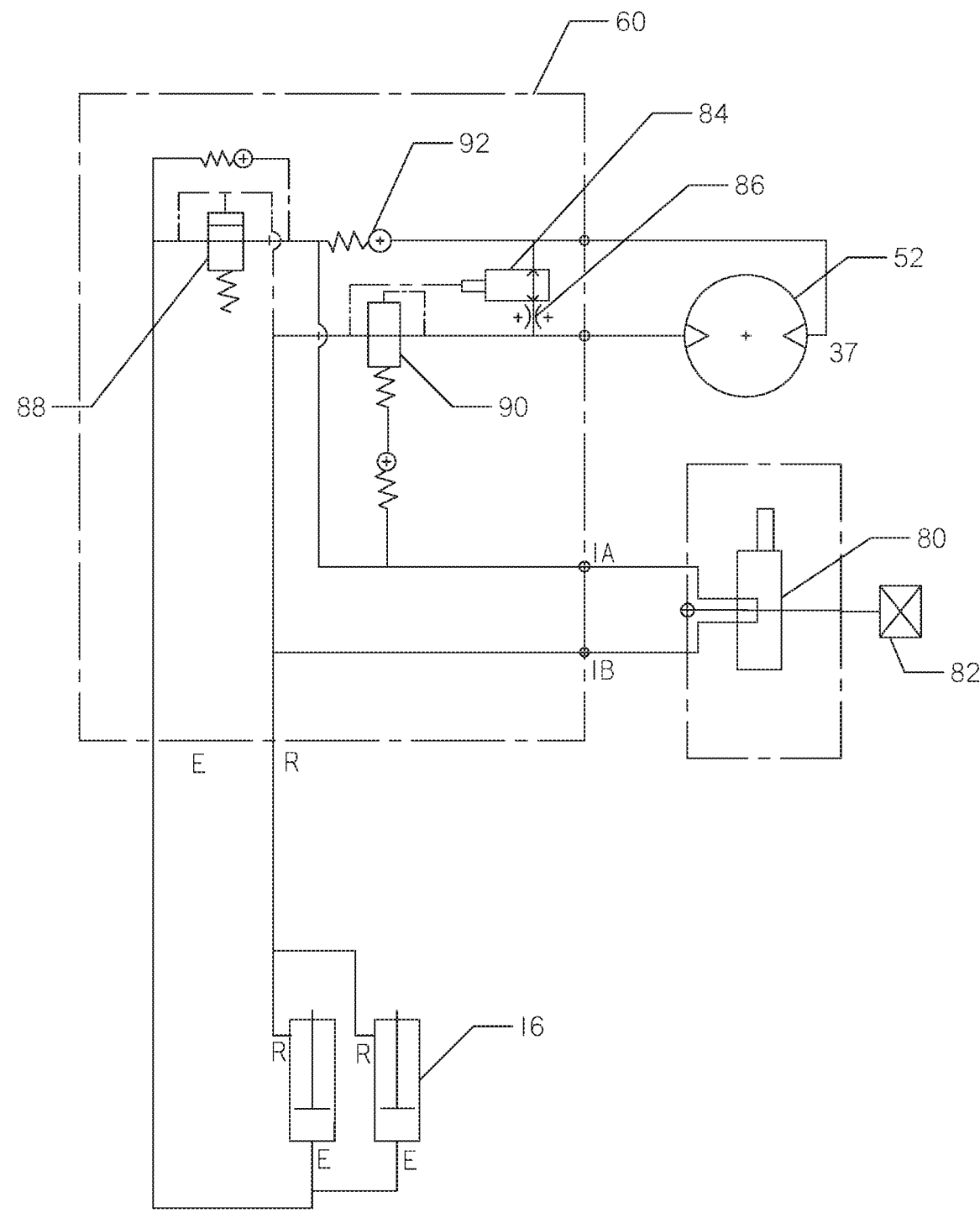
FIG. 7 is a schematic of the hydraulic control structure of the present invention.

With reference to FIG. 7, a control system schematic is shown. The system is controlled by a four port, three position single spool operator-controlled valve 80. The three valve 80 positions are: cylinder extend, cylinder retract and neutral.

With an operators hand off the valve 80, hydraulic manifold 60 will be in neutral and all hydraulic fluid that is pressurized through the power pack pump will pass through the operator control valve and back to the hydraulic reservoir or tank 82. Neither the system manifold 60, reel motor 52, nor cylinders 16 receive any hydraulic flow, therefore there is no action in the machine 10.

The manifold 60 comprises a bypass valve 84, an orifice 86, a counterbalance valve 88, a pressure reducing valve 90, and check valves 92. In various conditions of the manifold 60, one or more of these sub elements may be inactive or active based upon the needs of the system.

When in neutral, the machine 10 may be loaded externally in the form of reel 50 rotation induced by stripping wire rope 20. When this occurs, the reel motor 52 will act as a pump and circulate oil in a truncated bypass loop that bypasses the majority of the circuits in the control manifold 60. Instead, fluid is caused to pass through a motor bypass valve 84 and an orifice 86 which are in series.

The orifice 86 exists to produce modest back pressure for the reel motor 52 to pump against. Steel wire ropes 20 tend to naturally uncoil. Back pressure in the hydraulic system will prevent the spontaneous unspooling of the wire rope 20 while at rest. The wire rope 20 may be stripped off the reel 50 manually when desired to prepare for a pulling operation. Therefore, the bypass valve 84 and orifice 86 facilitate manual stripping of the wire rope 20 from the reel 50 when the machine 10 is otherwise at rest with the operator control valve 80 in neutral.

Shifting the operator control valve 80 to the cylinder extend position diverts flow from the tank 82 line to the 1A port and connects the B1 port to tank 82. The extend ports of the thrust cylinders 16 are then pressurized, causing the thrust cylinders to extend. The motor bypass valve 84 is closed. This allows the motor 52 to rotate backwards in a free wheel condition with the fixed orifice 86 providing overspeed protection by producing backpressure. The two check valves 92 remain closed preventing back pressure to the pressure reducing valve 9 and thus the back side of the motor 52.

The extension of the cylinders 16 causes the jaws 40 to move away from the reel 50 and strip wire rope 20 off the reel. This stripping action rotates and drives the reel 50, thereby turning the shaft of the motor 52 and causing it to act as a pump. Simultaneously, the extension of the cylinders 16 pulls wire rope 20 through the pipe 22, creating additional free cable length that will need to be wound on the reel 50 during retraction of the cylinders 16.

The third position of the operator control valve 80 is cylinder retract. This operation does not pull wire rope 20 out of the ground. All wire rope 20 that was pulled through during the previous extension stroke and all wire rope 20 stripped from the reel 50 during the previous extension stroke must now be stored on the reel 50. In order to store the wire rope 20, the reel motor 52 turns the reel 50.

If the cylinder 16 stroke is consistent, the combined length of cable produced in an extension stroke due to stripping off the reel 50 and pulling wire rope 20 through the pipe 22 will be consistent. However, the number of revolutions of the reel 50 to store this wire rope 20 will not be consistent. As the length of wire rope 20 stored on the reel 50 increases, so too does the diameter of the stored cable on the reel. As more wire rope 20 is stored, it takes fewer revolutions of the reel 50 to store a foot of length.

For this reason, the reel 50 must be able to rotate as much as is required to store the combined length or cable pulled through the bore and stripped from the reel during the previous extension cycle. The reel 50 should also keep modest tension on the wire rope 20 as the cylinders 16 retract so as to ensure the cable is wound tightly and orderly on the reel.

Hydraulically, the cylinder retract operation is achieved by shifting the operator control valve to the 1B position, which diverts flow from the tank line to the B1 port and connects the 1A port to tank 82. The relief function of the counterbalance valve 88 causes back pressure on the extend ports of the cylinders 16. This back pressure causes the motor bypass valve 84 to close. The pressure reducing valve 90 then limits the pressure to the motor 52 so the proper torque is achieved thus reeling in the slack wire rope 20 when the thrust cylinders 16 are retracting. The two check valves 92 are open allowing flow to tank 82. This allows the pressure reducing valve 90 and reel motor 52 to function normally.

Changes may be made in the construction, operation and arrangement of the various parts, elements, steps and procedures described herein without departing from the spirit and scope of the invention. The appended claims disclose one aspect of the invention herein, but are not to be construed as a limitation on the inventive subject matter disclosed in the figures and description of this application. Alternative structures, such as electric and mechanical actuators, may be substituted for hydraulic cylinders and motors without departing from the spirit of the invention.

The invention claimed is:

1. A wire pulling apparatus comprising:
a frame;
a pulling cylinder having a stationary end and a movable end, wherein the pulling cylinder is attached to the frame at the stationary end, and in which the movable end is extendable relative to the stationary end;
a vise assembly comprising opposed jaws configured to grip a wire rope and attached to the pulling cylinder at the movable end; and
a reel disposed within the frame.

2. The wire pulling apparatus of claim 1 further comprising a hydraulic motor configured to drive rotation of the reel.

3. The wire pulling apparatus of claim 2 further comprising a hydraulic control manifold in hydraulic fluid communication with the hydraulic motor and the pulling cylinder.

4. The wire pulling apparatus of claim 2 in which the hydraulic motor is bidirectional.

5. The wire pulling apparatus of claim 1 in which the pulling cylinder is vertically oriented.

6. A system, comprising:
a pipe slitter;
a wire rope having a first end and a second end, in which at least a portion of the wire rope is below ground;
in which the first end of the wire rope is attached to the pipe slitter; and the wire pulling apparatus of claim 1, in which the wire rope is disposed about the reel and within the vise assembly.

7. The system of claim 6 in which the reel rotates in a first direction during extension of the pulling cylinder.

8. The system of claim 7 in which the reel rotates in a second direction during retraction of the pulling cylinder.

9. The system of claim 6 further comprising:
a hydraulic motor configured to drive rotation of the reel; and
a hydraulic control manifold in hydraulic fluid communication with the hydraulic motor and the pulling cylinder.

10. The system of claim 9 in which the hydraulic control manifold is configured to allow:
a first condition in which hydraulic fluid is provided to extend the pulling cylinder and in which hydraulic fluid is not provided to power the hydraulic motor; and
a second condition in which hydraulic fluid is provided to retract the pulling cylinder and in which hydraulic fluid is provided to power the hydraulic motor.

11. The system of claim 10 in which the hydraulic control manifold further comprises a bypass valve and an orifice, in which:
in the first condition, the bypass valve is configured to isolate the hydraulic motor within a bypass loop and the orifice is configured to provide a backpressure to the hydraulic motor within the bypass loop.

12. A method of using the system of claim 6, comprising:
disposing the wire rope into a pipe to be replaced such that the pipe slitter is at one end of the pipe and the wire pulling apparatus is at an opposite end of the pipe;
gripping the wire rope with the vise assembly;
while the wire rope is gripped within the vise assembly, extending the pulling cylinder;
thereafter, retracting the pulling cylinder, thereby releasing the wire rope from within the vise assembly;
while the pulling cylinder is retracting, rotating the reel in a first direction to coil the wire rope thereabout;
thereafter, repeating the steps of gripping the wire rope with the vise assembly and extending the pulling cylinder.

13. The method of claim 12, further comprising:
during the step of extending the pulling cylinder:
simultaneously, allowing rotation of the reel in the second direction.

14. The wire pulling machine of claim 1 in which:
the opposed jaws are configured to grip together when the pulling cylinder extends and to release the grip when the pulling cylinder retracts.

15. The wire pulling machine of claim 1 in which the pulling cylinder is characterized as a first pulling cylinder and further comprising a second pulling cylinder attached to the frame at a stationary end, and defining a movable end extendable relative to the stationary end.

16. The wire pulling machine of claim 1 further comprising a pulley carried by the movable end of the pulling cylinder.

17. The wire pulling machine of claim 1 in which the pulley is characterized as a first pulley, and further comprising:
a second pulley attached to the frame;
in which at least a portion of the first pulley, the vise assembly, and the second pulley are linearly disposed.

18. The wire pulling machine of claim 17, further comprising:
an electric strike coil disposed proximate the second pulley.

19. A system comprising:
a wire rope; and
the wire pulling machine of claim 18, in which:
the wire rope passes, in order, through the electric strike coil, the second pulley, the vise assembly, the first pulley, and the reel.

20. A wire pulling apparatus comprising:
a frame;
a pulling cylinder having a stationary end and a movable end, wherein the pulling cylinder is attached to the frame at the stationary end, and in which the movable end is extendable relative to the stationary end;
a vise assembly configured to grip a wire rope and attached to the pulling cylinder at the movable end;
a reel disposed within the frame;
a hydraulic motor configured to drive rotation of the reel; and
a hydraulic control manifold in hydraulic fluid communication with the hydraulic motor and the pulling cylinder, in which the hydraulic control manifold is configured to allow:
a first condition in which hydraulic fluid is provided to extend the pulling cylinder and in which hydraulic fluid is not provided to power the hydraulic motor; and
a second condition in which hydraulic fluid is provided to retract the pulling cylinder and in which hydraulic fluid is provided to power the hydraulic motor.

21. The wire pulling apparatus of claim 20 in which the hydraulic control manifold comprises a bypass valve and an orifice, configured to isolate the hydraulic motor when the hydraulic control manifold is in the first condition.

22. A wire pulling apparatus comprising:
a frame;
a pulling cylinder having a stationary end and a movable end, wherein the pulling cylinder is attached to the frame at the stationary end, and in which the movable end is extendable relative to the stationary end;
a vise assembly configured to grip a wire rope and attached to the pulling cylinder at the movable end; and
a reel disposed within the frame;
in which the vise assembly comprises:
a jaw frame carried by the movable end of the pulling cylinder, having a tapered cavity disposed therein; and
a pair of opposed jaws disposed within the tapered cavity;
wherein the tapered cavity is wider in a direction of pulling cylinder extension than in a direction of pulling cylinder retraction.

* * * * *

UNITED STATES PATENT AND TRADEMARK OFFICE
CERTIFICATE OF CORRECTION

PATENT NO. : 11,619,336 B2
APPLICATION NO. : 17/022513
DATED : April 4, 2023
INVENTOR(S) : Randa et al.

It is certified that error appears in the above-identified patent and that said Letters Patent is hereby corrected as shown below:

In the Specification

Column 4, Line 35, please delete "are" and substitute therefor "area".

Signed and Sealed this
Ninth Day of May, 2023

Katherine Kelly Vidal
*Director of the United States Patent and Trademark Office*